UNITED STATES PATENT OFFICE.

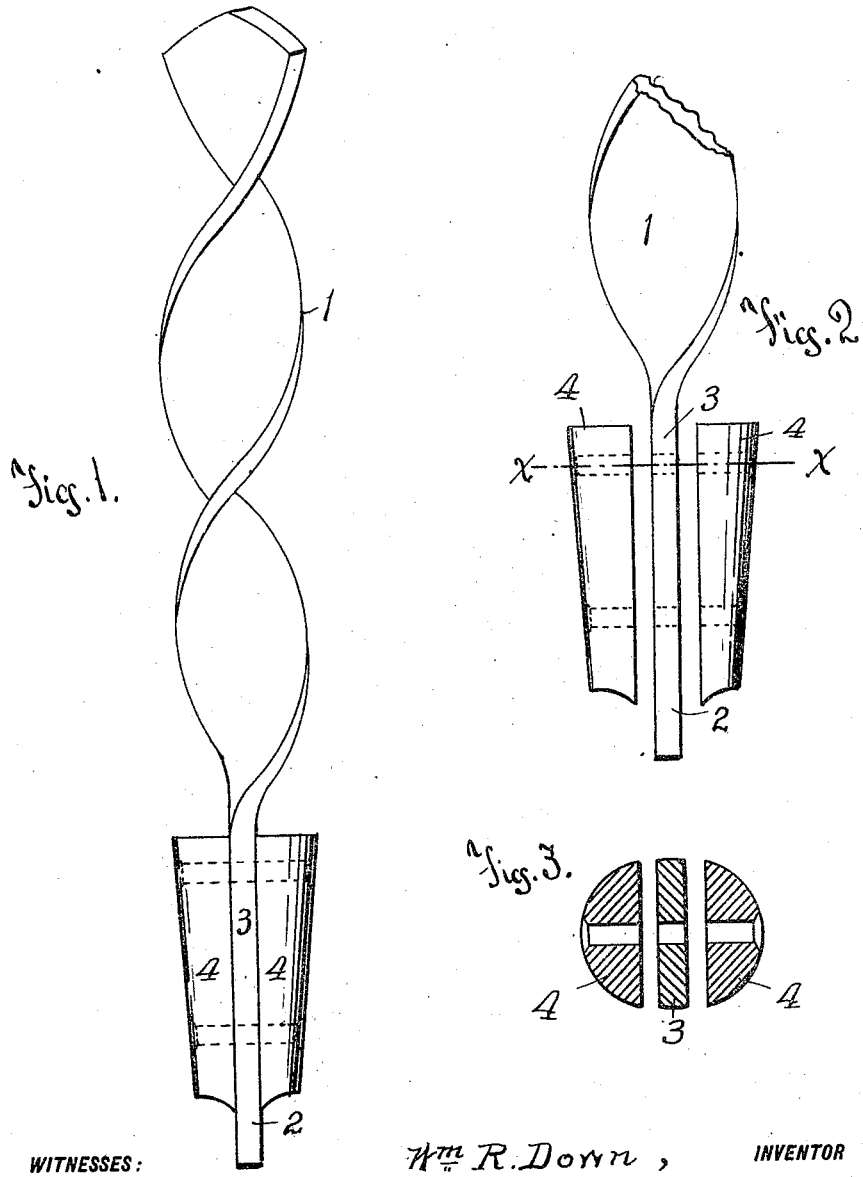

WILLIAM R. DOWN, OF FLEETWOOD, PENNSYLVANIA.

DRILL.

No. 896,280.  Specification of Letters Patent.  Patented Aug. 18, 1908.

Application filed February 3, 1908. Serial No. 413,951.

*To all whom it may concern:*

Be it known that I, WILLIAM R. DOWN, citizen of the United States, residing at Fleetwood, in the county of Berks and State of Pennsylvania, have invented certain new and useful Improvements in Drills, of which the following is a specification.

This invention relates to improvements in drills of the class commonly known as twist drills. Heretofore drills of this class have been made in either of the following ways, viz:—The drill is made from a solid, cylindrical bar, the flutes being formed by "milling". In this manner about one-half of the material is cut away and as these drills are necessarily made of very high grade material, the cost of the drills has been necessarily very great. The other method heretofore in use is to take a flat bar and twist it into the desired shape, leaving the shank end thereof straight but without any suitable shank for engagement by the socket in which these drills are ordinarily held. With this method a special chuck is required to grasp the drill when in use and these chucks have been found unsatisfactory in that they cannot, by reason of the shape of this end of the drill, hold it sufficiently rigid to bore a hole of the same diameter as that of the drill, there being necessarily some movement which enlarges the diameter of the hole.

My object in the present instance is to make a drill from a flat, or substantially flat bar, twisting it into the desired shape and attaching to the shank end thereof two approximately semi-circular shank pieces of low grade material, one at either side, thus forming a substantial and practically integral shank that may be held in the ordinary socket. In this manner I supply a drill of high grade steel with a shank of desirable shape at about one-half the cost of those heretofore made and one that will still be capable of engagement with an ordinary socket.

The invention is more fully described in the following specification and clearly illustrated in the accompanying drawing, in which:—

Figure 1 is an elevation of my drill complete. Fig. 2 shows the parts about to be assembled. Fig. 3 is a sectional view on line X—X of Fig. 2.

The numeral 1 designates the cutting end of the drill and 2 the shank end. This shank is made up of three parts, namely the central portion 3, being the end of the drill proper and two side pieces 4, each of which is substantially semicircular in cross-section and slightly tapered to facilitate its engagement in a socket. These pieces 4 are secured to the body of the drill by rivets, or by brazing or in any other suitable manner and when so attached form substantially an integral part of the drill.

As shown, the end portion 2 of the drill projects beyond the ends of the side pieces 4, and aids in centering the shank upon the chuck. The side pieces 4 may also be placed at selected positions on the end portion 2, in accordance with sizes and conditions, and form with said end portion a frusto-conical shank.

The result is a drill of substantial form, made at approximately one-half the cost of an ordinary twist drill in which the flutes are "milled" and which is capable of engagement in any ordinary socket.

Having thus fully described my invention, what I claim and desire to secure by Letters Patent is:—

A twist drill having a straight flat sided shank or end portion and members arranged on opposite sides and secured upon an intermediate portion thereof, said members being counterparts and of approximately semicircular cross section, having their curved faces of tapering outline and forming with the said end portion a frusto-conical shank.

In testimony whereof I affix my signature, in presence of two witnesses.

WILLIAM R. DOWN

Witnesses:
 ED. A. KELLY,
 E. B. WELDER.